United States Patent [19]

Long et al.

[11] Patent Number: 4,478,335
[45] Date of Patent: Oct. 23, 1984

[54] FLOPPY DISKETTE STORAGE CONTAINER AND DISPLAY DEVICE

[75] Inventors: Jerry M. Long, Pleasanton; James A. Womack, Los Gatos, both of Calif.

[73] Assignee: Innovative Concepts, Inc., San Jose, Calif.

[21] Appl. No.: 502,188

[22] Filed: Jun. 8, 1983

[51] Int. Cl.³ .............................................. B65D 85/30
[52] U.S. Cl. ................................ 206/444; 206/45.13; 206/45.18; 206/45.15; 206/45.23; 220/334
[58] Field of Search .................. 206/45.19, 45.23, 387, 206/425, 444, 44 B, 45.13, 45.15, 45.18; 229/1.5 R; 220/334

[56] References Cited

U.S. PATENT DOCUMENTS

| | | | |
|---|---|---|---|
| 2,930,160 | 3/1960 | Pohl | 206/45.13 |
| 2,936,067 | 5/1960 | Kaskey | 132/79 F |
| 3,360,116 | 12/1967 | Somers et al. | 220/334 |
| 4,216,862 | 8/1980 | Daenen | 206/459 X |
| 4,225,038 | 9/1980 | Egly | 206/425 |
| 4,310,091 | 1/1982 | Hara et al. | 206/455 |
| 4,356,918 | 11/1982 | Kahle et al. | 206/444 |

FOREIGN PATENT DOCUMENTS 2202349 11/1972 Fed. Rep. of Germany.

Primary Examiner—William T. Dixson, Jr.
Assistant Examiner—Brenda J. Ehrhardt
Attorney, Agent, or Firm—Hamrick, Hoffman, Guillot & Kazubowski

[57] ABSTRACT

A diskette storage container is formed of three molded plastic parts which are pivotally connected together. A substantially rectangular base member has upwardly rising side walls, a display operative in the bottom and cams adjacent the side walls. A cover member is pivotally connected to the base so that the rear edge of the cover passes into the base and rests at a slightly obtuse angle against the cams. A diskette support member is pivotally mounted to said cover and includes camming surfaces which ride on said cams as the cover is rotated toward its open position. A notch in said camming surface is positioned to engage the cams when the cover is fully opened. This allows the diskette support member to drop forward a predetermined distance which improves accumibility to the diskette.

15 Claims, 7 Drawing Figures

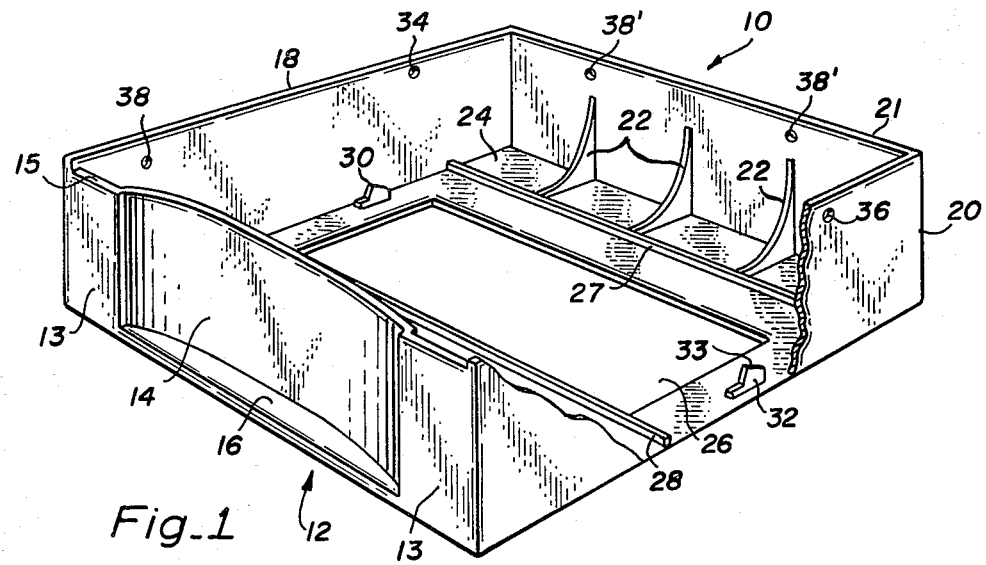
Fig_1
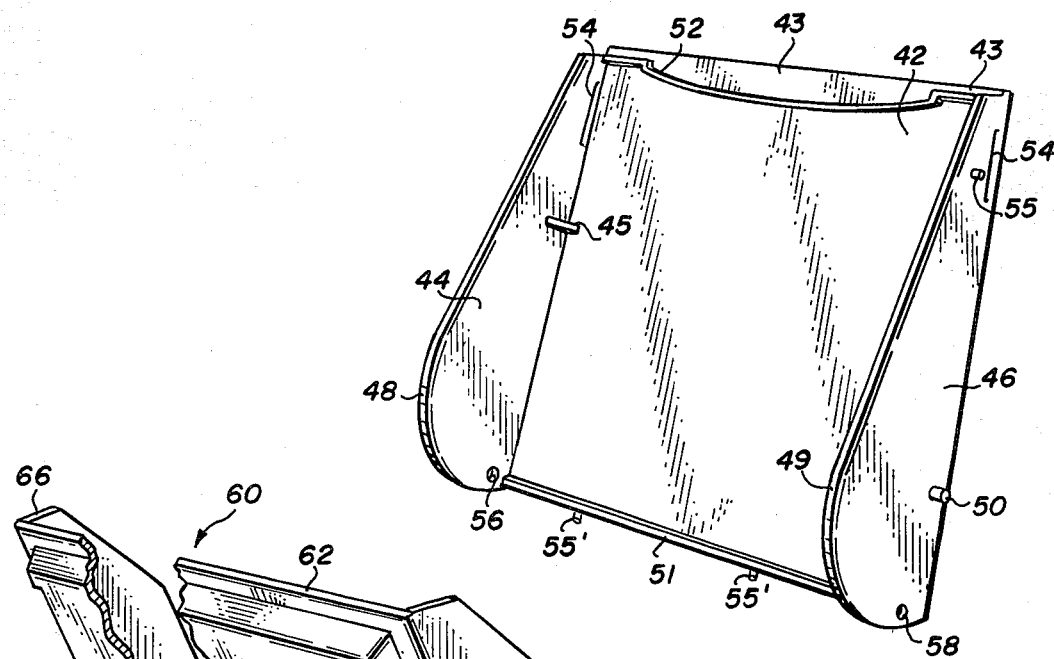
Fig_2
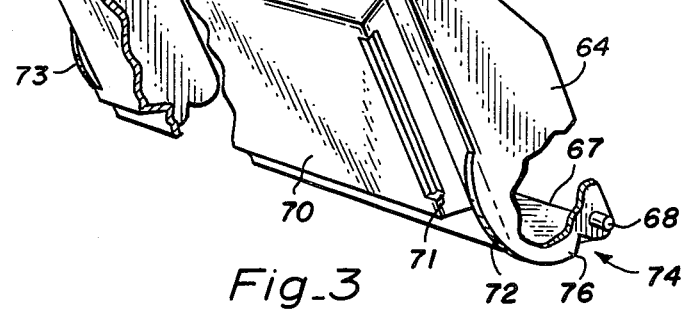
Fig_3

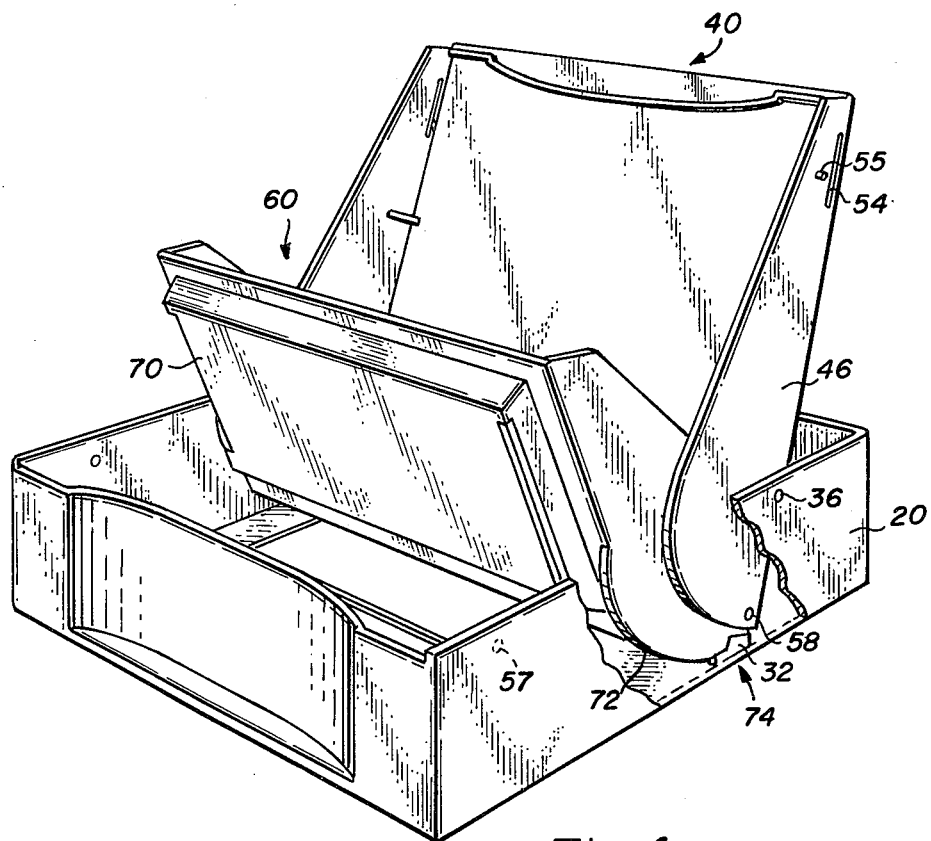
Fig_4
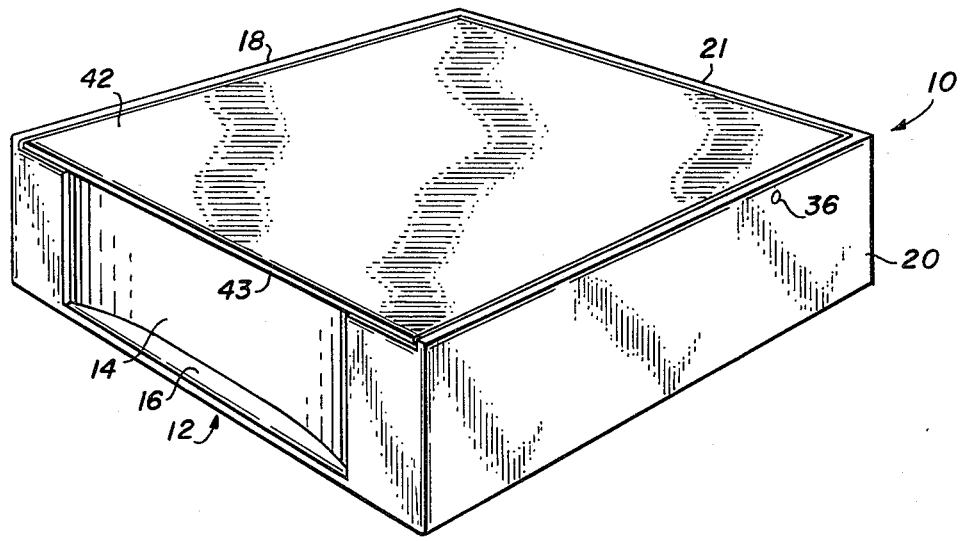
Fig_6

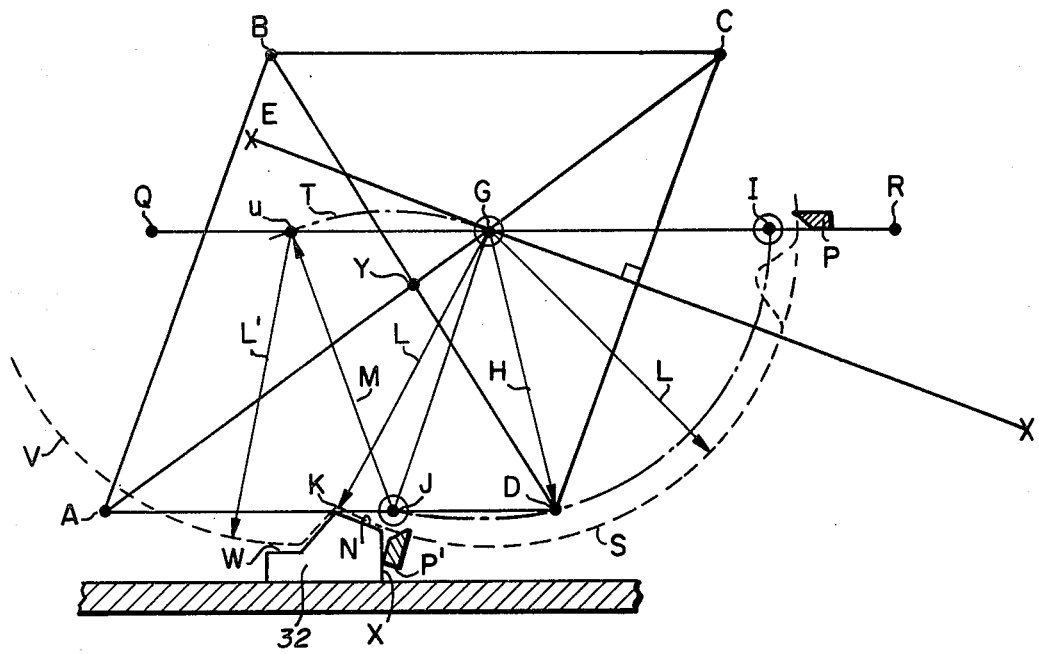
*Fig_5a*
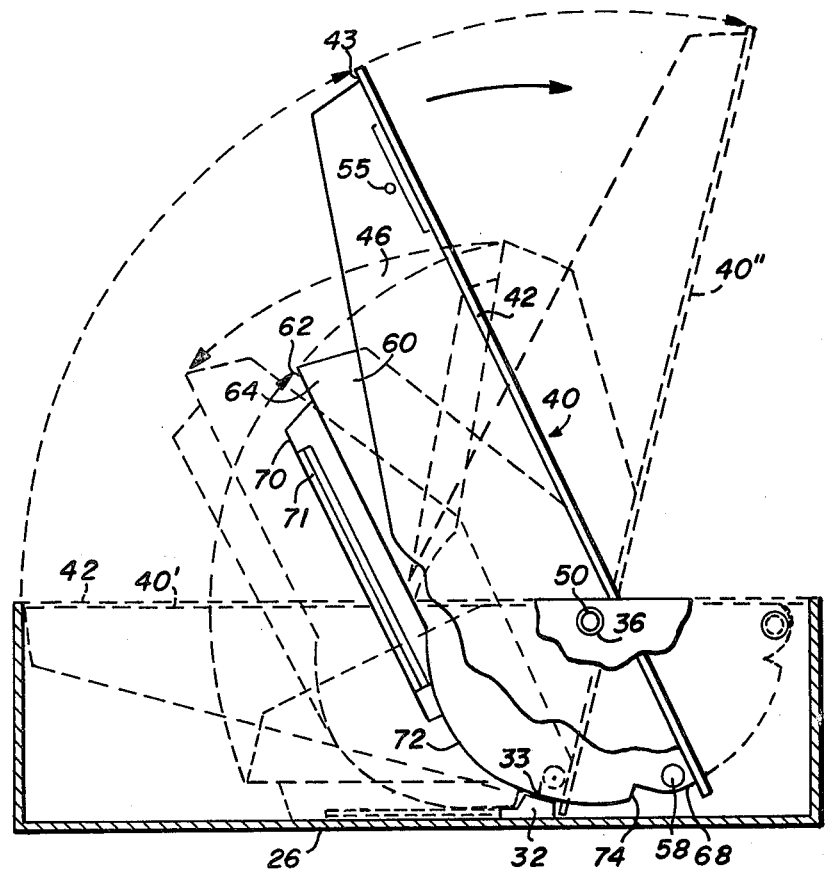
*Fig_5b*

FLOPPY DISKETTE STORAGE CONTAINER AND DISPLAY DEVICE

BACKGROUND OF THE INVENTION

1. Field of the Invention

This invention relates generally to storage containers for magnetic storage disks of the floppy diskette type and more particularly to a three-part molded storage container in which the three parts are snapped together at pivot points to provide a dust protected enclosure when closed and which can be opened into a position providing ready access to the plurality of diskettes stored therein.

2. Description of the Prior Art

The protection of floppy diskettes from dust and other adverse elements has long been a problem and a variety of containers have been devised for the storage thereof. Among these are those disclosed in U.S. Pat. No. Des. 251,273, issued Mar. 6, 1979, to R. A. Egly, and in U.S. Design application Ser. No. 080,417 filed Oct. 1, 1979, by Jerry M. Long, et al., and U.S. Utility application Ser. No. 322,968, filed Nov. 19, 1981, by Jerry M. Long, et al., both the design and utility applications commonly owned herewith. The problems with most such devices designed to be primarily oriented toward storage are that they do not provide easy access to the word processor, or where designed to provide easy access to the functional user, they are too bulky for storage. Or, in order to provide compact storage, they require a design which is complicated to manufacture. The invention disclosed in the referenced utility patent, overcame a number of these problems and has been well accepted. However, it depended on living hinges which after a period of time or excessive use tended to fail and render the device inoperative in the manner intended.

SUMMARY OF THE PRESENT INVENTION

It is therefore an object of the present invention to provide an improved storage container for magnetic storage elements such as floppy diskettes.

It is a further object of this invention to provide a storage container that is molded in three parts which may be snap-fitted together at its pivot points to form a compact storage unit.

Another object of the present invention is to provide an improved storage container which requires a minimum of mechanical force to move from its closed position to its opened position and vice versa.

Briefly, the invention includes a box-like molded base member open at the top, and including pivot holes at predetermined locations in the side walls thereof and camming means on the bottom adjacent said side walls; a molded closure member having a flat upper surface designed to cover the open top of the base member and including downwardly exteding side walls, each of which include pivot pins for snap-fitting into the pivot holes of the base member, and side walls of the closure member also including pivot holes; and a diskette support member including a flat tray disposed between upwardly extending side walls that include pivot pins, the tray providing diskette support both in the closed and open positions, the pivot pins in the side walls of the diskette support member being snap-fitted into the pivot holes of the closure member, a portion of the side walls extending downwardly to form camming surfaces which engage the camming means.

IN THE DRAWING

FIG. 1 is a partially broken perspective view of the base member;

FIG. 2 is a perspective view of the closure member of the invention;

FIG. 3 is a partially broken perspective view of the diskette support member of the invention;

FIG. 4 is a partially broken perspective view illustrating the present invention in its assembled configuration opened into its display position;

FIG. 5a is a generalized diagram illustrating the relationship of the pivotal connections, the camming surfaces and the cam-stop members for explaining design rules that should be followed in design thereof;

FIG. 5b is a side view with the adjacent side of the base member removed to more clearly illustrate the function of the cam-stop member (32) and the camming surface (72) of the diskette support member (60) and illustrating the location of both the diskette support member (60) and closure member (40) in a partially opened position (solid lines) and in the closed position (phantom lines); and FIG. 6 is a perspective view of the storage container in its closed position.

DETAILED DESCRIPTION OF THE PREFERRED EMBODIMENT

Referring now to FIG. 1, it may be seen that base member 10 includes a front wall 12 having flat front wall portions 13 and a curved depression 14 which provides a bottom lip 16 forming a gripping surface which may be used in opening the diskette storage container. Upwardly extending side walls 18 and 20, along with an upwardly extending back wall 21 and bottom 24 provide a substantially rectangular box-like enclosure having an open top. Ribs 22 connected between back wall 21 and bottom 24 provide needed rigidity of the molded structure and are formed to permit passage of a closure member (FIG. 2) as it moves between open and closed positions as will be discussed in more detail subsequently.

An aperture 26 is used in conjunction with a surface of a diskette support member (FIG. 3) to provide for viewing of a container index without opening the container. Transverse ribs 27 and 28 are formed in the molded structure to provide transverse support and rigidity. Rib 28 also helps to effect a dust proof enclosure of the forward edge of aperture 26. Cam-stop means 30 and 32 are formed adjacent to but spaced from the side walls 18 and 20, respectively, and are positioned so as to be forward of the pivot holes 34 and 36. The reason for the relative spacing of the cam-stops and the pivot holes will become clear in the subsequent discussion. Detent receptacles are also provided in each of the side walls, one being shown at 38 in side wall 18. A pair of detent receptacles 38' are positioned in the back wall as shown in FIG. 1. These detent receptacles are used in conjunction with associated detent projections on the closure member to securely lock the storage container in its closed position.

Referring now to FIG. 2, a perspective view of the interior of closure member 40 is shown. Top cover 42 is a substantially rectangular structure which is designed to cover the upper opening of base member 10 (FIG. 1). Left and right side walls 44 and 46 are formed at the side edges of the top cover 42 and extend downwardly from the inside of the top cover 42 to provide transverse support for floppy disks or diskettes stored within the storage member (FIG. 3). Stiffening ribs such as 45 are installed at the junction of the top cover 42 and the downwardly extending sides to provide essential rigidity and as guides to center the floppy disks during closure. A pivot pin 50 is shown on side wall 46 and a companion pivot pin (not shown) is provided on the exterior side wall 44. These pivot pins are snap-fitted to the pivot holes 34 or 36 of base 10 and allow the closure member to be mounted to the interior of the base so that it may be rotated about the axis established by the pivot locations. This permits the closure member to be rotated to its full open position or, if open, rotated to its closed position in which case the top surface of the top cover is disposed within and is in alignment with the sides 18 and 20 and the back wall 21.

It should be noted that in the closed position, the sidewalls 44 and 46 are closely adjacent the sides 18 and 20 of the base 12. The side edges shown at 48 and 49 are shaped to insure they pass above, i.e., clear of, the cam-stops 30 and 32, and botton 24; but may actually pass between the side of the cam-stop adjacent to the associated base side wall and the side wall as the closure member is rotated from its open position to its closed position. The forward edge of closure 40 is flush with front wall portions 13 so that it rests on the top of the front wall portion in the closed position. Note that front wall 12 (see top edge 15 in FIG. 1) is reduced in height in comparison with side walls 18 and 20, such difference being equal to the thickness of the top cover 42, thus, providing a flush surface when the diskette storage device is closed. At depression 16, the protrusion of lip 43 beyond depressed wall portion 14 provides a gripping surface for use in opening the storage container.

A dust rib or ridge 52 extends downwardly from the inner surface of top cover 42 and follows the form of front wall 12. Dust ridge 52 is positioned so as to be just inside of the inner wall of front wall 14 when the top cover is in its closed position. Indexing slots 54 are provided in the side walls 44 and 46 to permit insertion of an index card.

The closure member 40 is typically formed from a clear plastic material so that information on the index card can be readily observed without opening the storage box. Detent projections such as shown at 55 are positioned on each outer face of downwardly extending walls 44 and 46 and are located so as to mate with the detent receptacles 38 positioned on the side walls 18 and 20 of base member 10. Detent projections such as shown at 55' are positioned on the outside edge of downwardly extending dust ridge 51 and are located so as to mate with detent receptacles 38' positioned on the back wall 21 of base member 10. Pivot holes 56 and 58 are formed in side walls 44 and 46, respectively, and are located at the upper rear part thereof. These pivot holes are provided for snap attachment of the diskette support member 60 (FIG. 3).

Referring now to FIG. 3, a partially broken perspective view of diskette support member 60 may be seen. Support member 60 includes a base 62 and integrally formed upwardly extending side walls 64 and 66 together with a back wall 67 which is transverse to the side walls and forms an obtuse angle with the plane of base 62. Pivot pins 68 are provided at the exterior of side walls 64 adjacent to and nearly in the plane of the back wall 67. One such pivot pin is to be snapped into pivot hole 58 of member 40 (FIG. 2) whereas the companion pivot pin (not shown) is to be fitted into pivot hole 56 of closure member 40 thus joining the support member 60 with the closure member 40 in a pivotable relationship.

A depressed rectangular section 70 is formed in the base 62 and is structured to extend downwardly and fit into aperture 26 of base member 10 (FIG. 1) when the closure member 40 and its associated diskette support member 60 are in the closed position. Index tab slots such as that shown at 71 are provided at each edge of the depressed rectangular section 70 to permit insertion of an index card which identifies the floppy disks stored in this container.

Camming surfaces are formed on the lower rear edges of the side walls 64 and 66 as shown at 72 and 73 in FIG. 3. A notch 74 is formed in each of the camming surfaces with each forming a stop surface 76. The function of the cam notch and the stop will be discussed in more detail subsequently.

Referring now to FIG. 4, a partially broken perspective view of an assembled diskette storage container in accordance with the teaching of this invention is shown in the fully open position. Closure member 40 is pivotally attached to base member 10 with the pin 50 being inserted into the pivot hole 36, the pivot hole 34 not being shown. Likewise, the pivot pins of diskette support member 60 have been inserted into the pivot holes in closure member 40. Thus, the closure member 40 is pivotally attached to base member 10 and the diskette support member 60 is pivotally attached to and carried by the closure member 40. The function of the cam notch is particularly shown, as well as the function of cam-stop 32, to provide the stop or rest function. Referring to the structure revealed by the broken portion of side wall 20, it may be seen that camming surface 72 has run off of and dropped forward of cam-stop 32 so that notch 74 is matingly engaged with cam-stop 32 and cam notch stop 76 rests against the forward edge thereof holding the device in its open configuration.

A forward pressure on the top edge of closure member 40 will effect the following: (1) force the cam notch to ride over the cam-stop 32 forcing the diskette support member upward; and (2) rotate the camming surface 72 rearwardly into engagement with cam 32, thus permitting closure of the storage container.

Also in this most open position as shown in FIG. 4, it should be noted that the interior rear edge of top cover 42 is resting against the rearmost side of cam-stop 32. Because the cam-stops are positioned forwardly of the axis of the pivot pins 50 on closure member 40, there is a gravitational moment introduced which tends to hold the cover in this most open position.

An additional stabilizing effect is obtained by the use of cam notch 74 and its relation to cam-stop 32. Because the support member drops down when the cover is fully opened, it requires an applied closing force to move the camming surface 72 back up and into camming relation with the camming surface cam-stop 32. Thus, the cover is easily held in the fully open position even though disks or diskettes carried by the support member impose a closing force on the assembly.

Referring to FIGS. 5a and 5b, the relationship of the pivotal connections, the camming surfaces and the cam-stop members can be more readily understood. Although actually shown in FIG. 5b, the generalized diagram of FIG. 5a is helpful in explaining the design rules that should be followed in designing the device for various quantity storage embodiments. If the diskettes to be stored may be contained in a volume represented in cross-section by the rectangle ABCD, then the various pivot points may be located as follows:

(1) bisect ABCD by drawing a line from A to C;
(2) bisect line CD with a line EF which is normal thereto, the intersection of EF and AC locating a first pivot point G;
(3) construct a horizontal line QR passing through point G;
(4) using the distance DG as a radius H, swing an arc intersecting QR at I, and AD at J thus defining secondary pivot points at I and J;
(5) select a point K between A and J along line AD to locate the forward extremity of a first cam surface N (member 32) defined by swinging an arc of radius L (line GK) about point G, such arc being continued in the counterclockwise direction to define a second cam surface S for sliding engagement with the cam N;
(6) using the line GJ to define a radius M and swing an arc T about point J to locate a point U at the intersection of arc T and line QR;
(7) using the radius L located as shown at L', swing an arc V to locate the position of the cam surface S after point G has been moved to point U, such arc also defining a first stop surface W on the cam member 32; and
(8) a second stop surface X is located at the position P' of the rear edge P when the closure member 40 has been rotated into the full open position.

The center of mass or centroid of ABCD will be located at Y, FIG. 5a, which is at the intersection of the diagonal line AC connected between points A and C and the diagonal line BD which is connected between B and D. As may be seem from the diagram, the above-described design rules for setting the relationship of the pivotal connections, the camming surfaces and the cam-stop members is effective in locating the centroid rearward of cam-stop 32, when the cover member is in the fully opened position. Thus, a rearwardly acting force will be applied to hold the cover member in the open position.

In FIG. 5b, the sectional view and phantom views of the present embodiment are illustrated, the full-line sectional view being shown at a point where the closure member 40 has not yet been rotated to a point that cam notch 74 has engaged cam-stop 32, and the broken-line sectional views 40' and 40" showing the closure member 40 in its closed and open positions respectively. The figure illustrates how the diskette support member 60, with its camming surface 72 riding on the cam surface 33 of cam-stop 32, is supported in a fixed, nesting relationship with respect to top cover 42, both in the closed position and in the partially opened position. This relationship continues until closure member 40 reaches the open position 40" at which time notch 74 engages cam-stop 32 and the support member, presently in the position shown by broken lines 60', drops down and rotates forwardly into the position shown by the dashed lines 60", a position which provides ready access to the disks or diskettes stored therein.

Referring now to FIG. 6, a perspective view of the disk storage container is shown in which the container is in its closed position. As explained previously, the top cover 42 fits within the walls forming the upwardly facing opening of base member 10 except that since the upper edge of the front wall 12 is lower than the side walls 20 and 18 by the thickness of the top cover 42 the fowardmost edge 43 of the cover extends forwardly of the top of front wall 12. Pivot hole 36 and its companion pivot hole in side wall 18 are positioned just below the top edges of the side walls so as to position the upper surface 42 flush with the top edges when the closure member 40 is in its closed position. Opening of the closure member 40 is easily attained by pressing down on lower lip 16 and pulling upwardly on the lip 43 of top cover 42 at the depression 14.

Although the present invention has been described herein in terms of a presently preferred embodiment, it will be appreciated by those skilled in the art that alterations and modifications thereof may readily be made to suit particular needs and applications. It is therefore intended that the following claims be interpreted as covering all such alterations and modifications as fall within the true spirit and scope of the invention.

What is claimed is:

1. An improved diskette holder comprising:
   a generally rectangular base member having a means forming a bottom surface and four upturned walls forming an open top, and camming means disposed adjacent to two of said walls;
   a closure member attached to said base member by first pivot means and having a portion configured to provide a closure for the open top of said base member and having two downwardly turned side walls pivotally affixed to corresponding walls of said base member, said side walls being shaped to pass clear of said camming means when said closure member is rotated about said first pivot means; and
   a diskette support member having means forming a diskette support surface and a pair of upturned side walls attached to said downwardly turned side walls of said closure member by second pivot means and forming camming surfaces for engaging said camming means, said camming surfaces each having a notch formed therein for receiving said camming means when said closure member has been rotated through a predetermined arc about said first pivot means thereby allowing said support member to rotate about said second pivot means away from said closure member.

2. A storage and display unit as recited in claim 1 wherein said first pivot means is disposed rearwardly of said camming means and said second pivot means is disposed on said closure member at a point disposed rearwardly of said first pivot means when said closure member is rotated into a closed configuration and is disposed forwardly of said first pivot means when said closure member is rotated into an open configuration.

3. A storage and display unit as recited in claim 2 wherein said first pivot means is disposed rearwardly of the centroid of said diskette support member.

4. A storage and display unit for floppy diskettes and the like comprising:
   means forming a generally rectangularly shaped base receptacle having an open top, a bottom and upwardly extending front, back and sidewalls, first pivot apertures near the top rear part of said side walls and first and second cam-stops each of which includes an upper surface and front and rear sides, each said cam-stop being mounted on the interior of said bottom adjacent one of said side walls;
   cover means having an outer surface for providing a top surface for closing said open top of said base receptacle when in a closed condition and having an inner surface, said cover means having downwardly extending side walls each having an inner and outer surface, said side walls including first pivot pins on said outer surface thereof for pivotally mounting in said first pivot apertures, and second pivot apertures located at the top, rear portion of said side walls;

support means for providing a substantially flat upper support surface for disk storage or use, said support means having upwardly extending side walls in which second pivot pins are provided at an upper, rear location of an outer surface thereof, said second pivot pins being inserted in said second pivot apertures, said upwardly extending side walls providing the sides of a diskette storage container and the upper support surface and inner surface of said cover means providing, respectively, the bottom and top of said container, the support means also including a rear surface extending upwardly from said support means and at an angle therewith, said rear surface providing support for the diskettes when the storage unit is open for display, the front end being open for insertion or removal of selected diskettes; and camming means for engagement with said upper surface of said cam-stops, said camming means being adapted for attachment to said support means.

5. A storage and display unit as set forth in claim 4 wherein said portion extends rearwardly from said front edge to a point intermediate said front and rear edges and said another portion extends rearwardly from said intermediate point to said rear edge.

6. A storage and display unit as set forth in claim 4 wherein said forming means comprises:
   a front wall having a depression therein above said bottom surface to provide space for a finger grip and in conjunction with said bottom a lip is formed which may be gripped to facilitate opening of the storage unit.

7. A storage and display unit as set forth in claim 6 wherein said forming means further comprises:
   index aperture means for viewing the storage unit index prior to opening the case; and
   detent receptacles formed in the upper forward portion of each side wall and in the upper part of said back wall.

8. A storage and display unit as set forth in claim 5 wherein said cover means comprises:
   a thin, rectangularly shaped top member of a size to mate with the open top portion of said forming means, said cover means including front, rear and side edges, and having a back portion adjacent said rear edge which rests against said back side of each said cam-stop when the cover is fully opened, the location of the cam-stops being selected to obtain a predetermined backward angle, thus preventing inadvertent closure during removal, selection or insertion of a diskette;
   said front edge being flushed with the front edge of said bottom of said forming member when in the closed position so as to form a top lip forward of said depression;
   a dust seal formed by a downward extension from the inner surface of said cover means which mates with the interior surface of the front wall of said forming means; and
   thin side walls extending downwardly from said side edges of said top member, the side walls being shaped at the bottom rear edges so as to clear said cam-stops, and reduced in size at the forward ends but maintained sufficiently wide so as to provide against transverse motion of said diskettes.

9. A storage and display unit as set forth in claim 8 wherein said cover means further comprises:
   a top formed from a clear material;
   index aperture means in each side wall designed to accept an index card so as to permit viewing the storage unit index prior to opening the case;
   detent projections formed in the forward ends of said side walls and in said back wall being located for mating engagement with corresponding ones of said side and back wall detent receptacles when the cover is in a closed position, whereby the storage unit cover is secured to said forming member.

10. Apparatus as set forth in claim 4 wherein said support means comrises;
   a thin, generally rectangularly shaped tray having a pair of side edges, front and rear edges, bottom and top surfaces and a width between said side edges which just fits within the downwardly extending side walls of said cover means and a back to front length less than that of said cover means, but long enough to prevent tipping over of the diskettes which lean against said top surface;
   side walls which extend upwardly from each said side edge and are flush with the bottom surface of said tray along a portion of each side;
   camming surfaces which extend downwardly from said bottom surface along another portion of each side, said camming surfaces cooperating with said cam-stops to maintain said support means in a substantially parallel spaced relationship with said cover means as the storage unit moves between a closed and a fully opened condition; and
   a back end being downwardly sloped so as to cause a height separation of the stored diskettes whereby individual indicies on said diskette labels may be discerned.

11. A storage and display unit as set forth in claim 5 wherein a notch is provided in each said camming surface adjacent said rear edge so that when the cover means is fully opened, the notch engages with said cam-stop which allows the support means to fall forward to provide greater access to said stored diskettes, and to lock said container in its open position.

12. A storage and display unit as set forth in claim 7 wherein said forming means further comprises:
   a bottom surface having a rectangular aperture located therein between said cam-stops; and
   a stiffener bar located adjacent the forward edge of said aperture for providing rigidity as well as dust protection.

13. A storage and display unit as set forth in claim 11 wherein said support means comprises:
   a thin, generally rectangularly shaped tray having a pair of side edges, front and rear edges and bottom and top surfaces and a width between said side edges which just fits within the downwardly extending side walls of said cover means, and a back to front length less than that of said cover means, but long enough to prevent tipping over of diskettes which lean against the inside surface thereof;
   a depression in said rectangularly shaped tray for mating with the aperture in the bottom of said forming means when the unit is closed;
   thin side walls which extend upwardly from said side edges and are flush with the bottom surface of said tray along a portion of each side edge;

camming surfaces which extend downwardly from said bottom surface along another portion of each said side edge, said camming surfaces causing said support means to be maintained in a substantially parallel spaced relationship with said cover means as the storage unit is opened; and a rear surface being downwardly sloped so as to cause a height separation of the stored diskettes whereby individual indicies on the diskette covers may be discerned.

14. A storage and display unit as set forth in claim 13 wherein thin slots are formed in sides of said depression for insertion of an index card which may be viewed without opening the storage and display unit.

15. A storage and display unit as set forth in claim 14 wherein the top of said cover means is formed of a clear material and said downwardly extending sides of said cover means include thin slots near the proximal end for snap-insertion of an index card or other identification information.

* * * * *